July 20, 1937.　　　J. KATZMAN　　　2,087,408
PAPER CONDENSER
Filed Nov. 8, 1934

INVENTOR
JACOB KATZMAN
BY
ATTORNEY

Patented July 20, 1937

2,087,408

UNITED STATES PATENT OFFICE 2,087,408

PAPER CONDENSER

Jacob Katzman, Brooklyn, N. Y., assignor to Nova Electric Corporation, New York, N. Y., a corporation of New York Application November 8, 1934, Serial No. 752,029

6 Claims. (Cl. 175—41)

My invention relates to condensers, and more specifically, to paper condensers.

Paper condensers may be either of the outside wound type or the inside wound type, each having inherent special advantages.

Outside wound condensers have the advantage of being non-inductive, because the current is led to the edges of the protruding foils. Moreover, the foil, usually made out of tin and protruding from the edge of the condenser, enables terminals to be quickly and readily attached. On the other hand, in this type of condenser there is a considerable waste of material since the protruding foils do not add to the capacity of the condenser and hence is a waste of material as regards to its capacity.

Inside wound condensers have the advantage of using less material for the same capacity. This type, however, has the disadvantage of requiring an outwardly protruding tab to make connection to the foil. This extra thickness of tab produces increased pressure on the dielectric, particularly at its edges, and thus weakens the dielectric. Breakdowns of this type of condenser therefore usually occur at the edges of the tabs. The inside wound condenser also has the disadvantage of having relatively high inductance because the current is led to one spot in the foil when it has to travel the entire length of the foils to reach the ends. This type of condenser therefore fails to effectively by-pass radio frequency. If aluminum foil is used on an inside wound section, it is found that very often the tab makes poor electrical contact with the aluminum because of the fact that the surface of contact is very small, and because the aluminum is always covered with a thin oxide film.

Accordingly, an object of my invention is to provide a paper condenser embodying the advantages of both the inside and outside wound condensers without the attendant disadvantages of either.

A further object of my invention is to provide a novel paper condenser.

Still a further object of my invention is to provide a novel combined inside and outside wound condenser having the inherent advantages of both and none of the disadvantages.

Figure 1:
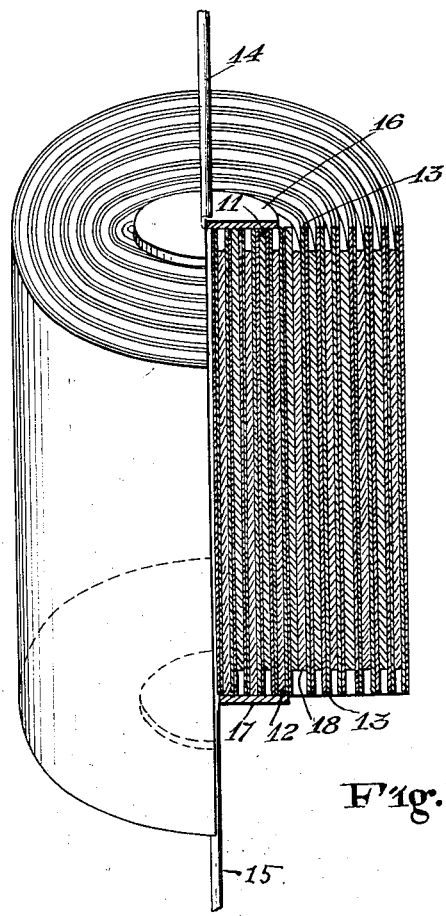
Figure 2:
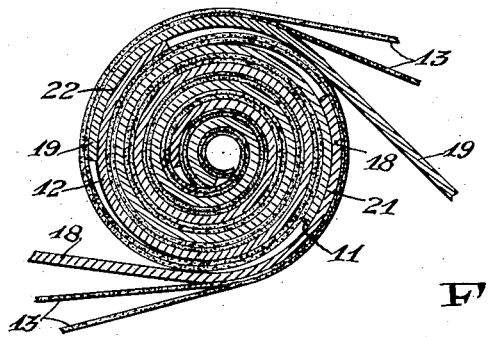

There are other objects of my invention which together with the foregoing will appear in the detailed descriptions to follow, in which Figure 1 is a perspective partly in section of one form of my invention; and Figure 2 is a transverse cross section of my invention.

In accordance with my invention, I first wind an outside wound condenser consisting of electrodes 11 and 12, suitably connected as by soldering as at 16 and 17, to the electrodes 11 and 12 respectively.

At a suitable place, I change the winding to an inside wound condenser, the electrodes 18 and 19 of the inside wound condenser being arranged to overlap at the beginning thereof, the outside wound condenser as illustrated at 21 and 22, Fig. 2.

If, for example, a .5 microfarad condenser is to be made, I propose, in accordance with my invention, to wind .1 microfarad outside wound with tin foil. I then continue the winding for another .4 microfarad inside winding, the beginning of the second winding considerably overlapping that of the first winding as described. The outside wound .1 microfarad section enables easy connection to the terminals and gives sufficient non-inductive filtering action for radio frequency. The .4 microfarad inside winding, being a continuation of the .1 microfarad section, automatically is connected in parallel with the .1 microfarad section. This combination has all the economic advantages of an inside wound section without the disadvantages and difficulty of making connections and objections due to its inductance. If sufficient overlapping of the adjacent end portions is allowed between the .1 and .4 microfarad sections, the winding of the .4 microfarad section may be continued with aluminum foil without any danger of poor contact; firstly because of the large area of contact, and secondly because of the considerable capacity between overlapping foils, caused by this large area and by the microscopic thickness of the dielectric presented by the oxide coating on the aluminum.

I claim:

1. An electrical condenser comprising a first and second conducting layer, separated by dielectric spacers, and wound into a coiled form, terminal connections to edges of said spaced first and second conducting layers to form an outside wound, substantially non-inductive capacitive section, a third conducting layer electrically connected to one end of said first conducting layer, a fourth conducting layer electrically connected to one end of said second conducting layer, said third and fourth conducting layers being wound concentrically with said coiled form as an inductive capacitive section for adding to the capacitance of said non-inductive capacitive section by forming a continuing capacitive section effectively electrically connected in parallel with said outside wound section, said condenser having sufficient capacity to by-pass relatively low frequency electrical currents, the outside wound section thereof having sufficient capacity to by-pass relatively high frequency electrical currents.

2. An electrical condenser comprising a first and second metal foil layer, separated by dielectric spacers, and wound into a tubular form, each of said metal foil layers being displaced towards opposite edges of said dielectric spacers so as to extend to the corresponding edges of said spacers, a terminal individual to each of said metal foil layers and connected to the extending edges thereof to form an outside wound, substantially non-inductive, capacitive section; and a first conducting layer electrically connected to one end of said first metal foil layer, a second conducting layer electrically connected to one end of said second metal foil layer, dielectric spacers for said conducting layers, said conducting layers being wound concentrically about said tubular form as an inductive capacitive section, said condenser having sufficient capacity to by-pass relatively low frequency electrical currents, the outside wound section thereof having sufficient capacity to by-pass relatively high frequency electrical currents.

3. An electrical condenser comprising a first and second conducting layer, separated by dielectric spacers, and wound into a tubular form, terminal edges to connections of said spaced first and second layers to form a substantially non-inductive, capacitive section; a first aluminum foil layer connected to one end of said first conducting layer, a second aluminum foil layer connected to one end of said second conducting layer, said aluminum foil layers being wound concentrically about said tubular form as an inductive capacitive section for adding to the capacitance of said non-inductive capacitive section by forming a continuing capacitive section effectively electrically connected in parallel with said non-inductive section, said condenser having sufficient capacity to by-pass relatively low frequency electrical currents, the outside wound section thereof having sufficient capacity to by-pass relatively high frequency electrical currents.

4. A by-pass electrical condenser comprising a first and second conducting layer, separated by dielectric spacers, and wound into a coiled form, each of said conducting layers being displaced towards opposite edges of said dielectric spacers so as to extend to corresponding edges of the spacers, a terminal individual to each of said conducting layers and connected to the extending edges thereof to form an outside wound, substantially non-inductive, capacitive section; a first aluminum foil layer electrically connected to one end of said first conducting layer, a second aluminum foil layer electrically connected to one end of said second conducting layer, said aluminum foil layers being wound concentrically with said coiled form for adding to the capacitance of said non-inductive capacitive section by forming a continuing capacitive section, said condenser having sufficient capacity to by-pass relatively low frequency electrical currents, the outside wound section thereof having sufficient capacity to by-pass relatively high frequency electrical currents.

5. An electrical condenser comprising a first and second conducting layer, separated by dielectric spacers, and wound into a coiled form, each of said conducting layers being displaced towards opposite edges of said dielectric spacers so as to extend to corresponding edges of the spacers, a terminal individual to each of said conducting layers and connected to the extending edges thereof to form an outside wound, substantially non-inductive, capacitive section; a third conducting layer electrically connected to one end of said first conducting layer by overlapping of adjacent end portions thereof, a fourth conducting layer electrically connected to one end of said second conducting layer by overlapping of adjacent end portions thereof, dielectric spacers for said third and fourth conducting layers, the width of said third and fourth conducting layers being less than the width of their associated dielectric spacers, said third and fourth conducting layers being wound concentrically with said coiled form for adding to the capacitance of said non-inductive capacitive section by forming a continuing inside wound capacitive section effectively electrically connected in parallel with said outside wound section, said condenser having sufficient capacity to by-pass relatively low frequency electrical currents, the outside wound section thereof having sufficient capacity to by-pass relatively high frequency electrical currents.

6. An electrical condenser comprising a first and second conducting layer, separated by dielectric spacers, and wound into a coiled form, terminal connections individual to edges of said spaced first and second conducting layers to form an outside wound, substantially non-inductive, capacitive section; and a first aluminum foil layer electrically connected to one end of said first conducting layer by overlapping of adjacent end portions thereof, a second aluminum foil layer electrically connected to one end of said second conducting layer by overlapping of adjacent end portions thereof, said aluminum foil layers being wound concentrically with said coiled form for adding to the capacitance of said non-inductive capacitive section by forming a continuing capacitive section effectively electrically connected in parallel with said outside wound section said condenser having sufficient capacity to by-pass relatively low frequency electrical currents, the outside wound section thereof having sufficient capacity to by-pass relatively high frequency electrical currents.

JACOB KATZMAN.